United States Patent [19]
Lardellier

[11] Patent Number: 5,103,635
[45] Date of Patent: Apr. 14, 1992

[54] CONTRA-ROTATING FAN ENGINE

[75] Inventor: Alain M. J. Lardellier, Melun, France

[73] Assignee: Societe Nationale d'Etude et de Construction de Moteurs d'Aviation "S.N.E.C.M.A.", Paris, France

[21] Appl. No.: 578,675

[22] Filed: Sep. 7, 1990

[30] Foreign Application Priority Data

Sep. 27, 1989 [FR] France ................. 89 12630

[51] Int. Cl.⁵ ............................. F02K 3/00
[52] U.S. Cl. .................. 60/226.1; 60/268; 415/79
[58] Field of Search ........... 60/39.162, 268, 226.1, 60/226.2, 226.3; 415/77, 79, 191; 416/129

[56] References Cited
U.S. PATENT DOCUMENTS 4,765,135  8/1988  Lardellier ............ 60/39.162
4,796,424  1/1989  Farrar et al. ............ 60/268

Primary Examiner—Louis J. Casaregola
Assistant Examiner—Howard R. Richman
Attorney, Agent, or Firm—Oblon, Spivak, McClelland, Maier & Neustadt

[57] ABSTRACT

A gas turbine engine intended for use as an aircraft engine which includes a gas generator which supplies interdigitated, contra-rotating radially inner and outer low-speed power turbines driving forward mounted contra-rotating front and rear fans, the gases flowing through the gas generator from the rear of the engine towards the front, and then flowing in a rearward direction through the power turbines. The front fan is driven by the radially inner power turbine via a central shaft extending towards the front of the engine and supporting a disc carrying the front fan, and the rear fan is driven by the radially outer power turbine via a forwardly extending drum which is rotatably mounted between the central shaft and a stationary structure of the engine and which carries the rear fan. This structure permits the pod mounting of a high by-pass ratio engine under wing of an aircraft.

9 Claims, 2 Drawing Sheets

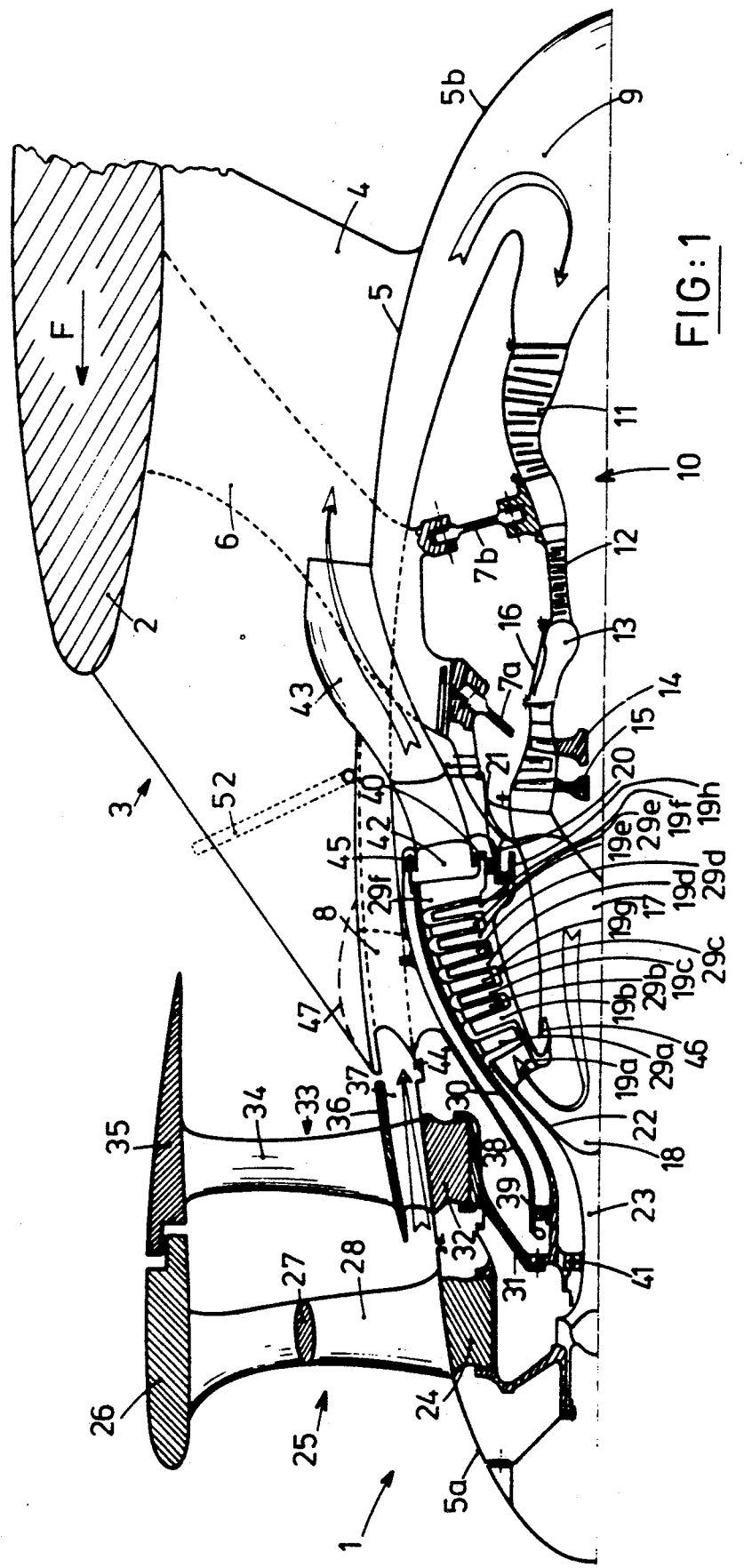

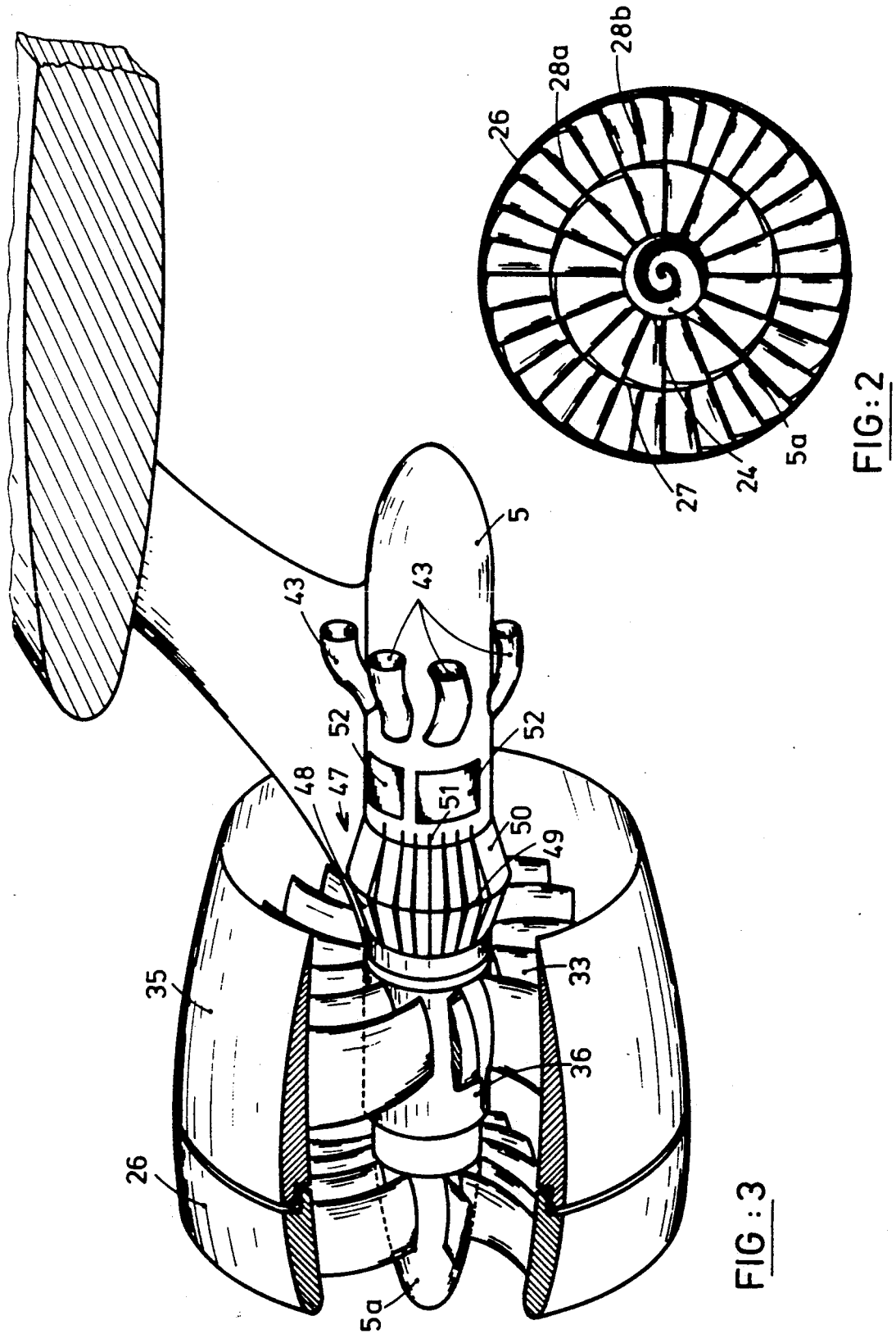

CONTRA-ROTATING FAN ENGINE

BACKGROUND OF THE INVENTION

1. Field of the Invention

The present invention relates to a gas turbine engine intended for use as an aircraft engine, of the type comprising a gas generator which supplies two interdigitated, contra-rotating, low-speed, power turbines.

2. Summary of the Prior Art

FR-A-2 535 394 describes a gas turbine engine of this type in which the power turbines are arranged downstream of the gas generator and are directly driven by the hot gases emerging from the generator. The turbines, directly and without any reduction gearing, drive either two contra-rotating propeller stages, or two ducted fan stages to provide propulsion. Two mounting solutions are proposed. One envisages arranging the propellers or the fans at the rear of the engine, which presents problems and difficulties when the engine is to be mounted under the wing of an aircraft. The other envisages mounting them at the front of the engine, which requires the use of connecting shafts in order to effect the drive, the location of such shafts also presenting problems.

FR-A-2 560 642 describes a gas turbine engine of the same type in which a contra-rotating supercharging compressor is associated with the contra-rotating forward mounted fans. Means for regulating the pitch of the blades of a fan stage is incorporated and permits flow reversal to be obtained.

FR-A-2 606 081 describes a gas turbine engine of the above-mentioned type in which, in relation to the direction of travel of an aircraft propelled by the engine, the gas flow through the gas generator is forward from an annular chamber arranged at the rear of the engine and is supplied with air by an air intake assembly comprising a plurality of ducts disposed around the outer casing of the engine, and the hot gas flow emerging from the gas generator is reversed so as to flow in a rearward direction through the power turbines, the internal arrangement of the engine comprising, in succession from front to rear:

the interdigitated contra-rotating power turbines and the axial outlet duct from the gas generator in partial radial superposition;
the turbine stages of the gas generator;
the combustion chamber;
the compression stages of the gas generator; and,
the annular air inlet chamber of the gas generator.

According to this document the contra-rotating power turbines are arranged to drive two contra-rotating propeller stages situated at the same longitudinal level as the power turbines, the engine thus constituting a forward propeller turboprop unit of the type known as a "tractor propfan".

SUMMARY OF THE INVENTION

One object of the present invention is to provide a modification of the engine described above in which the upstream fans are no longer arranged in radial superposition with the power turbines and the axial outlet duct from the gas generator, but are instead disposed forward of the power turbines, thus making it possible to obtain an engine having the same bypass ratio but with a much lower main torque.

It is also an object of the invention to facilitate the formation of a modular sub-assembly comprising the contra-rotating power turbines and the fans such that the subassembly is more easily detachable from the gas generator from the front.

Another object of the invention is to provide a low drag turbojet unit which facilitates its mounting as a tractor turbojet engine under the wing of an aircraft.

Accordingly, the invention provides a gas turbine engine intended for use as an aircraft engine and having front and rear ends defined in relation to the direction of travel of an aircraft propelled by said engine, including:

an outer casing;

air intake means including a plurality of ducts arranged within said outer casing and an annular chamber for receiving said intake air from said ducts;

a gas generator disposed to receive said intake air from said annular chamber and comprising
compression stages,
a combustion chamber, and
turbine stages for driving said compression stages, said annular chamber being located to the rear of said gas generator and said generator being arranged such that said intake air travels in a forward direction successively through said compression stages, said combustion chamber, and said turbine stages thereof;

an axial duct extending forwardly from said gas generator;

interdigitated, contra-rotating radially inner and outer low-speed power turbines disposed outwards of said axial duct in radially superposed relationship thereto;

means connected to said axial duct for receiving gases conducted thereby from said gas generator and reversing the direction of flow of said gases to feed said gases in a rearward direction through said power turbines to drive said turbines;

two forward mounted contra-rotating fans arranged one in front of the other to define a front fan and a rear fan;

means drivingly interconnecting said radially inner power turbine to said front fan, said means including
a central shaft connected to said inner power turbine and extending towards the front of said engine, and
means supporting said front fan on said central shaft;

means drivingly interconnecting said radially outer power turbine to said rear fan, said means including
a forwardly extending drum connected to said outer power turbine and rotatably mounted around said central shaft, and
means supporting said rear fan on said drum;

wherein the disposition of said engine comprises, in succession from front to rear:
said front fan;
said rear fan and, in radially superposed relation, part of said air intake means;
said interdigitated power turbines and, in radially superposed relation, said axial duct from said gas generator;
said gas generator turbine stages;
said combustion chamber;
said gas generator compressor stages; and
said annular chamber of said air intake means.

According to a preferred feature of the invention, the blades of the front fan carry an intermediate ring at about the mid-height position of the blades to divide the fan into inner and outer sections, and the front fan comprises additional blades arranged between the intermediate ring and an outer ring of the fan to provide the outer section with a number of blades twice that of the inner section.

Further characteristics of the invention will become apparent from the following description of preferred embodiments with reference to the accompanying drawings.

BRIEF DESCRIPTION OF THE DRAWINGS

FIG. 1 is a diagrammatic longitudinal axial half sectional view of one embodiment of a turbojet engine in accordance with the invention.

FIG. 2 is a front view of the upstream fan of an embodiment comprising an intermediate ring and an outer annular portion having a greater number of blades than the inner annular portion.

FIG. 3 is a diagrammatic, partially cut-away view of another embodiment of the invention, including means for modifying the cross-section of the secondary flow-path downstream of the rear fan.

DESCRIPTION OF THE PREFERRED EMBODIMENTS

In FIG. 1, which shows a gas turbine engine of the forward turbofan type, the engine 1 is shown connected to the wing 2 of an aircraft by a pylon-mast 3 which comprises a structure 4 rigidly connected to the outer casing 5 of the engine, and which further comprises a support pylon 6 to which supporting links 7a and 7b are fixed. The outer casing 5 of the engine comprises a front part 5a and a rear part 5b of aerodynamically profiled, generally conical shape.

The terms front and rear are defined in relation to the direction of travel of the propelled aircraft as indicated by the arrow F shown on the aircraft wing 2. Circumferentially spaced around the outer casing 5 of the engine are a plurality of ducts 8 constituting an air intake assembly opening into a first annular plenum chamber 9. In the ducts 8, the air flows from front to rear, and from the chamber 9 the air undergoes a first reversal of direction to flow forwards through a gas generator 10 comprising elements which are known and conventional but which are arranged in succession in a particular manner.

Progressing from the rear towards the front, the gas generator comprises a low pressure multiple stage axial compressor 11, then a high pressure multiple stage axial compressor 12 from which the compressed air passes into an annular combustion chamber 13 which supplies hot gases to high pressure and low pressure turbines 14 and 15 respectively driving the compressors. The gas generator 10 thus constituted is supported by and connected to the support pylon 6 by the links 7a and 7b, which are secured to the outer casing 16 of the gas generator in the region of the compressor casing, thus advantageously locating the securing points in a cold zone. The gas generator 10 is extended forwards by an axial gas outlet duct 17 which conducts the gases to a second annular chamber 18, from which the gases undergo a second reversal of direction to flow rearwards through power turbine stages disposed radially outwards of the duct 17 in radial superposition therewith.

The power turbines comprise a first turbine rotor 19 having several blade stages 19a,19b,19c,19d,19e,19f of which the bases are secured to an inner drum 19g radially inwards of the blades. The downstream end of the drum forms a cylindrical bearing 19h, and a support 21 is arranged between the cylindrical bearing and a structural ring 20. The radially outer ends of the first stage blades 19a of the free turbine 19 are connected by a conical member 22, which bounds the chamber 18, to a central shaft 23 extending towards the front 5a of the engine and supporting a disc 24 bearing the front fan 25.

In the embodiment illustrated, the fan 25 has an outer ring 26 for ducting the secondary flow, and an intermediate ring 27 formed by fins of the blades 28. The intermediate ring 27 defines an outer section which, in the embodiment of FIG. 2, comprises an intermediate blade 28b between each pair of blades 28 so that the outer section contains twice as many blades as the inner section. The purpose of this arrangement is to increase the resistance of the fan to ingestion. This fan is of a monobloc design and is made from composite materials.

The second rotor 29 of the low-speed turbines has six stages 29a to 29f connected by an outer drum 29g comprising a forward part in the form of a conical sleeve 30 terminating in a cylindrical ring which carries a collar 31 supporting the disc 32 of the rear fan 33. The latter has blades 34 and an outer ring 35, and rotates in the opposite direction to that of the front fan.

In the lower region of the blades 34 the fan 33 carries an intermediate platform 36 forming a ring which is arranged as an upstream extension of the outer casing 5 of the engine and which defines an annular air inlet assembly 37 for the air intake ducts 8 of the hot flow. This fan is also of monobloc design and made from composite materials.

The turbine 29/fan shaft 30 assembly is rotatably mounted at its front end inside a structural conical member 38 of the engine by means of an upstream bearing 39, and at its rear end on the outside of the structural ring 20 by means of a bearing 40.

An upstream bearing 41 situated between the central shaft 23 of the front fan and the shaft 30 of the rear fan permits the rotation of the shaft 23.

At the rear end of the power turbines 19 and 29, an annular gas outlet duct 42 for primary flow of the engine leads into a plurality of separate ducts 43 opening outside the outer casing of the engine, the ducts 43 being arranged around the casing and interposed between the air intake ducts 8.

The assembly constituted by the free turbines 19,29 and the fans 25 and 33 forms a modular unit which can be disconnected easily from the front of the gas generator 10 at the position of the labyrinth seals 44,45,46 which ensure fluid-tightness between the rotating parts and the structural part of the engine.

As already mentioned, the fans are preferably made as monobloc units using a composite material. This permits application to engines with very high by-pass ratios, the peripheral speed of the streamline flow being below 200 m/s, and has the advantage of leading to a potential mass reduction.

In the above-described embodiment, the fans 25 and 33 have fixed pitch blades. With such a construction it may be advantageous to provide for adjustment of the cross-section of the secondary flow-path in order to achieve compensation for the absence of variable pitch blades. Such adjustment of the outlet section of the secondary nozzle may be obtained by means of a deformable device 47 (diagrammatically shown by dotted lines in FIG. 1) carried by the upstream part of the outer casing 5 of the engine. This deformable device may comprise an outer annular skin radially inflatable by pneumatic or hydraulic means.

In the embodiment shown in FIG. 3, an alternative arrangement for the deformable device 47 is used, comprising an annular assembly of longitudinal driving flaps 48 pivoted at their upstream edge on the outer casing 5. At their downstream edge 49 the flaps 48 are hinged to driven downstream flaps 50 which have their downstream edges slidable in longitudinal guides 51 in the casing 5. The flaps 48,50 may be moved by actuators to form a throat of variable section with the downstream part of the rear outer ring 35, thereby achieving adjustment of the cross-section of the secondary flow path.

An engine such as herein described may be equipped with a secondary flow reversal system constituted by panels 52 hinged at their downstream edge on the casing 5 and radially movable by actuators to effect the partial obstruction of the secondary flow and thereby achieve the cold flow reversal function.

The embodiments described above comprise fans of monobloc construction. However, it will of course be appreciated that the fans may be made in conventional manner with detachable blades mounted in notches in the discs 24 and 32, and the rings 26 and 35 formed by top platform assemblies of the blades.

When the blades are of individual construction, the fans may be fitted with an arrangement for varying the pitch of the said blades, which will avoid the need for a deformable arrangement for modifying the cross-section of the secondary flow path.

The advantage of such structures in accordance with the invention lies in being able to make tractor fan engines of very high by-pass ratio and low main torque, which facilitates their suspension mounting below the wings of an aircraft, this type of mounting being particularly necessary for quadrijet aircraft.

What is claimed is:

1. A gas turbine engine for use as an aircraft engine and having front and rear ends defined in relation to the direction of travel of an aircraft propelled by said engine, including:
   an outer casing;
   air intake means including a plurality of ducts arranged within said outer casing and an annular chamber for receiving said intake air from said ducts; a gas generator disposed to received said intake air from said annular chamber and comprising
   compression stages,
   a combustion chamber, and
   turbine stages for driving said compression stages, said annular chamber being located to the rear of said gas generator and said generator being arranged such that said intake air travels in a forward direction successively through said compression stages, said combustion chamber, and said turbine stages thereof;
   a forwardly extending axial duct extending from said gas generator;
   interdigitated, contra-rotating radially inner and outer low-speed power turbines disposed radially outwards of and in communication with said axial duct;
   means connected to said axial duct for receiving gases conducted thereby from said gas generator and reversing the direction of flow of said gases to feed said gases in a rearward primary flow direction through said power turbines to drive said turbines;
   two forward mounted contra-rotating fans arranged one in front of the other to define a front fan and a rear fan;
   means drivingly interconnecting said radially inner power turbine to said front fan, said means including
   a central shaft connected to said inner power turbine and extending towards the front of said engine, and
   means supporting said front fan on said central shaft;
   means drivingly interconnecting said radially outer power turbine to said rear fan, said means including
   a forwardly extending drum connected to said outer power turbine and rotatably mounted around said central shaft, and
   means supporting said rear fan on said drum; wherein the disposition of said engine comprises, in succession from front to rear:
   said front fan;
   said rear fan which is radially disposed about part of said air intake means;
   said interdigitated power turbines which are radially disposed about said axial duct from said gas generator;
   said gas generator turbine stages;
   said combustion chamber; said gas generator compressor stages; and
   said annular chamber of said air intake means, wherein said engine includes a conical first structural ring surrounding said power turbines and having a cylindrical end portion forward thereof, and a second structural ring positioned at least partially within the rear end of said power turbines, the assembly including said rear fan and said radially outer power turbine connected thereto being rotatably mounted at the front by means of a bearing disposed on the inside of aid cylindrical end portion of said first structural ring and at the rear by means of a bearing carried by the downstream inner end of said outer power turbine and disposed outside of said second structural ring.

2. A gas turbine engine according to claim 1, wherein said rear fan includes a base platform and a second platform disposed radially outwards of said base platform and arranged to form a forward extension of said outer casing of said engine, said platforms defining therebetween said part of said air intake means.

3. A gas turbine engine according to claim 1, wherein each of said fans includes an outer ring for ducting a secondary flow of said engine.

4. A gas turbine engine according to claim 1, wherein said fans are each provided with a blade-pitch changing mechanism.

5. A gas turbine engine according to claim 3, wherein each of said fans has a fixed blade pitch, and the forward part of said outer casing of said engine is provided with deformable means for modifying the output cross-section of the secondary flow path of said engine.

6. A gas turbine engine according to claim 5, wherein said deformable means comprises an annular assembly of first flaps hingedly connected at an edge portion thereof to said outer casing, actuator means for moving said first flaps, and second flaps hingedly connected to said first flaps and movable thereby.

7. A gas turbine engine according to claim 3, wherein said outer casing includes secondary flow direction reversal panels hingedly mounted at their downstream edge, and actuators for rotating said panels about said hinged downstream edges.

8. A gas turbine engine according to claim 1, wherein the assembly consisting of said front fan and said radially inner power turbine connected thereto is rotatably mounted at the front by means of a bearing disposed between said central shaft and said drum supporting said rear fan, and at the rear by means of a bearing disposed between said second structural ring and a bearing surface at the downstream end of said inner power turbine.

9. A gas turbine engine according to claim 3, wherein the blades of said front fan carry a intermediate ring at about the mid-height position of said blades dividing said fan into inner and outer sections, and said front fan comprises additional blades between said intermediate ring and said outer ring to provide said outer section with twice a many blades as said inner section.

* * * * *

UNITED STATES PATENT AND TRADEMARK OFFICE
CERTIFICATE OF CORRECTION

PATENT NO. : 5,103,635
DATED : April 14, 1992
INVENTOR(S) : Alain M. J. Lardellier It is certified that error appears in the above-identified patent and that said Letters Patent is hereby corrected as shown below:

```
In the "ABSTRACT" on the title page:
    line 16, after "permits" delete "the";
    line 17, after "under" insert --the--.

Column 5, line 17, after "in" insert --a--.
Column 6, line 34, change "aid" to --said--.
```

Signed and Sealed this

Twentieth Day of July, 1993

Attest:

MICHAEL K. KIRK

*Attesting Officer*      *Acting Commissioner of Patents and Trademarks*